United States Patent [19]

Yu

[11] Patent Number: 5,493,344

[45] Date of Patent: Feb. 20, 1996

[54] MOTION VECTOR ESTIMATION METHOD AND APPARATUS HAVING HALF-PIXEL ACCURACY

[75] Inventor: Pil-ho Yu, Suwon, Rep. of Korea

[73] Assignee: Samsung Electronics Co., Ltd., Kyungki, Rep. of Korea

[21] Appl. No.: 239,519

[22] Filed: May 9, 1994

[30] Foreign Application Priority Data

May 8, 1993 [KR] Rep. of Korea .................. 93-7917

[51] Int. Cl.$^6$ .................. H04N 7/28; H04N 7/36
[52] U.S. Cl. .................. 348/699; 348/700; 348/402; 348/416; 348/419; 348/415; 348/405; 348/411
[58] Field of Search .................. 348/416, 412, 348/415, 419, 409, 405, 699, 700

[56] References Cited

U.S. PATENT DOCUMENTS

| | | | |
|---|---|---|---|
| 4,862,267 | 8/1989 | Gillard et al. | 348/416 |
| 4,937,666 | 6/1990 | Yang | 348/412 |
| 5,173,772 | 12/1992 | Choi | 348/699 |
| 5,212,248 | 5/1993 | de Haan | 348/699 |
| 5,276,513 | 1/1994 | van der Wal et al. | 348/416 |
| 5,311,305 | 5/1994 | Mahadevan et al. | 348/699 |
| 5,355,168 | 10/1994 | Sugiyama | 348/416 |
| 5,398,078 | 3/1995 | Masuda et al. | 348/699 |

FOREIGN PATENT DOCUMENTS

| | | | |
|---|---|---|---|
| 2236449 | 4/1991 | United Kingdom | H04N 5/14 |
| 93/16556 | 8/1993 | WIPO | H04N 7/137 |

*Primary Examiner*—Tommy P. Chin
*Assistant Examiner*—Anand S. Rao
*Attorney, Agent, or Firm*—Sughrue, Mion, Zinn, Macpeak & Seas

[57] ABSTRACT

A system estimating the movement of video signals to half-pixel accuracy includes a first motion detector receiving the present video block data and data for a corresponding search area for detecting a first motion vector signal due to the differences in data between the present video block and respective previous video blocks in the search area and generates error signals for respective vertical, horizontal and diagonal directions due to the video data differences between the blocks, a vector component detector receiving the error signals from the first motion detector for generating component detection signals representing respective vertical and horizontal components of a second motion vector having half-pixel accuracy with respect to the vertical, horizontal and diagonal directions, and a second motion detector for detecting a second motion vector signal in response to respective component detection signals generated by the vector component detector. A motion vector generator receives the first and the second motion vector signals and vector-sums the received signals to output the vector-summed result as a final motion vector. A corresponding motion estimation method is also described.

13 Claims, 3 Drawing Sheets

MOTION VECTOR ESTIMATION METHOD AND APPARATUS HAVING HALF-PIXEL ACCURACY

BACKGROUND OF THE INVENTION

1. Field of the Invention

The present invention relates to a motion estimation system for compressing motion video data and, more particularly, to a half-pixel motion vector estimation apparatus capable of estimating a motion vector having half-pixel accuracy using peripheral blocks of video blocks corresponding to the motion vector which is estimated by pixel accuracy used in a differential pulse code modulation (DPCM) method of encoding a digital video signal. A motion estimation method having half-pixel accuracy is also disclosed.

Korean Patent Application No. 93-7917 is incorporated herein by reference for all purposes.

2. Discussion of Related Art

A variety of encoding methods have been proposed to effectively compress data for transmission by encoding a difference signal between the respective frames, primarily in video processing technology fields using a continuous digital video signal, e.g., high definition television, digital video cassette recorders and multi-media system, etc. DPCM encoding is a familiar example of such a method. Using the DPCM encoding process, data is compressed to a greater degree as the difference signal between frames grows smaller, i.e., when the video signal representing the difference between the respective frames of a television signal is encoded. For a still image having no movement between the frames, the difference signal between the frames becomes zero, thereby maximizing the data compression efficiency. However, the larger the movement between the frames, the larger the difference signal between the frames, thereby lowering the data compression efficiency.

In order to minimize this defect in the DPCM encoding method, one frame can be divided into a number of blocks, each of which has a predetermined magnitude. Then, the interframe motion is estimated for each block. Accordingly, the difference signal between the video blocks, which belong to a frame corresponding to and different from each other is transmitted by motion estimation, thereby enhancing the data compression efficiency.

The motion estimation is accomplished by comparing the video blocks within the previous frame with the video block within the present frame, both of which are created by the one pixel movement in the vertical and horizontal directions, and then finding the video block having the smallest difference signal. Since it is difficult in view of an actual system realization to compare each block of the present frame with the whole blocks within the previous frame, a search area having a predetermined magnitude corresponding to each block is set for the previous frames. The motion vector is then determined by search in that area. The smaller the size of the block, the more accurate the search for movement is, which increases the size of the motion vector. It should be noted that the larger the size of the search area becomes, the larger the movement which can be found in that search area, which increases the magnitude of the motion vector.

World Patent No. WO 93/16556 A1, which is commonly assigned to the assignee of the instant application, discloses a motion vector estimation method which has half-pixel accuracy and which uses a search area composed of the video block within the present frame having a pixel size of $N_1$ and $N_2$ and a video block within the previous block having a pixel size of $M_1 \times M_2$. The above-identified world patent estimates motion vector having half-pixel accuracy using an error value based on the motion estimation. In contrast, British Patent Publication No. GB 2,236,449 A, published on Mar. 4, 1991, discloses a motion vector estimation method having half-pixel accuracy achieved through a sub-integer-pixel estimation method for the motion vector using a correlation function.

SUMMARY OF THE INVENTION

The principal object of the present invention is to provide a motion vector estimation method having half-pixel accuracy in vertical, horizontal and diagonal directions using a motion vector having one pixel accuracy, which is estimated in a search area of a predetermined size, thereby enhancing data compression efficiency.

Another object of the present invention is to provide an apparatus embodying a motion vector estimation method having half-pixel accuracy.

These and other objects, features and advantages according to the present invention are provided by a motion vector estimation method which estimates movement with respect to a video signal using a search area composed of the present video block and a plurality of other video blocks, each of which has the same size as that of the present video block. The motion vector estimation method includes steps for:

- receiving data in the present video block and data in a plurality of previous video blocks defining a search area and then detecting first motion vector due to data differences between the present and previous video blocks;
- identifying the previous video block corresponding to the detected first motion vector, shifting the previous:video block by one pixel in the vertical, the horizontal and two diagonal directions, thereby forming respective peripheral video blocks;
- comparing the respective peripheral video blocks with the data of the present video block and generating error signals due to the video data differences between respective blocks in correspondence to an associated block comparison;
- checking whether there is a vertical component and a horizontal component representative of a second motion vector having half-pixel accuracy with respect to the vertical, the horizontal and the two diagonal directions in response to the error signals;
- generating a second motion vector responsive to a result of the checking step; and
- vector-summing the first and the second motion vectors to thereby generate a final motion vector.

These and other objects, features and advantages according to the present invention are provided by a motion vector estimation apparatus which estimates movement of a video signal using a search area composed of the present video block and a plurality of other video blocks each having the same size as that of the present video block. More specifically, the motion vector estimation apparatus includes:

- a first motion detector in which data in the present video block and data of a plurality of previous video blocks in the search area are received, for detecting a first motion vector signal due to differences in data between respective video blocks, each of the data of a selected previous video block corresponding to the detected first motion vector signal and the data of a plurality of peripheral video blocks obtained by shifting the previous video block by one pixel in the vertical, the horizontal and two diagonal directions, respectively, is compared with the data of the present video block, thereby generating respective error signals due to the video data difference between respective present and peripheral video blocks;

vector component detection means for generating component detection signals which represents the presence of a vertical component and a horizontal component of a second motion vector having half-pixel accuracy with respect to the vertical, the horizontal and the two diagonal directions in response to the error signals supplied from the first motion detector;

a second motion detector providing the second motion vector in response to the component detection signals supplied from the vector component detection means; and motion vector generating means for vector-summing the first and the second motion vector signals and generating a vector-summed signal.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which.

DETAILED DESCRIPTION OF THE PREFERRED EMBODIMENT

A preferred embodiment of the present invention will be described below in more detail with reference to the accompanying drawings.

Figure 1:
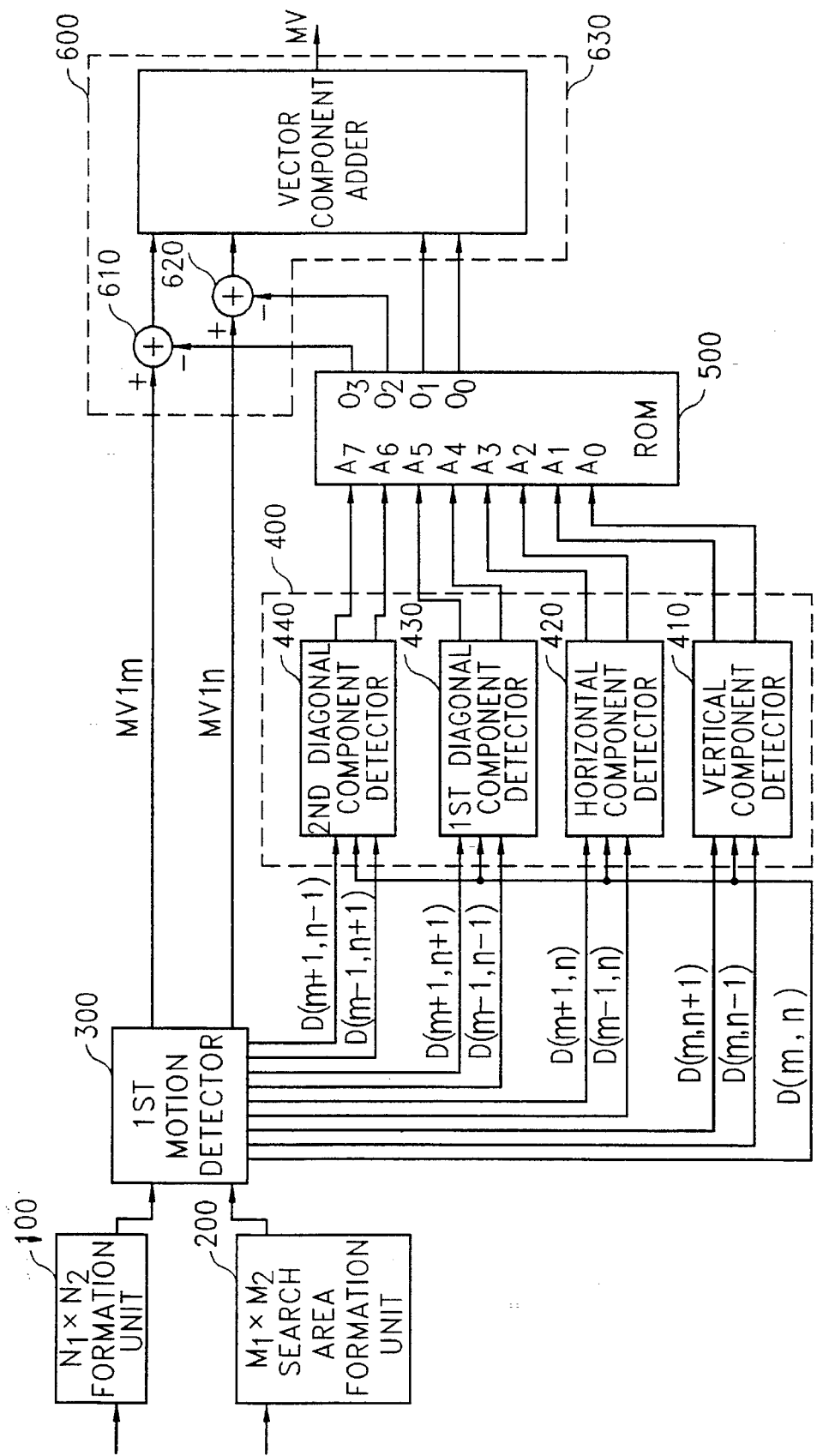
FIG. 1 is a high level block diagram of a motion vector estimation apparatus having half-pixel accuracy according to the present invention.

FIG. 1 illustrates a preferred embodiment of a motion vector estimation apparatus having half-pixel accuracy according to the present invention, includes $N_1 \times N_2$ block formation unit 100 receiving a present video signal and $M_1 \times M_2$ search area formation unit 200 receiving the video signal of the previous frame and forming at least one video block composed of $M_1 \times M_2$ pixels. The outputs of $N_1 \times N_2$ block formation unit 100 and $M_1 \times M_2$ search area formation unit 200 are provided to a first motion detector 300 for detecting first motion vector ($MV1_m$, $MV1_n$) having units of one pixel.

Preferably, first motion detector 300 shifts the previous video block having a size of $N_1 \times N_2$ pixels by one pixel in the vertical, the horizontal and two diagonal directions, centered with respect to a reference pixel within the previous frame corresponding to the detected first motion vector to thereby generate peripheral video blocks, and then outputs respective error values due to the differences in data between the generated peripheral video blocks and the video block within the present frame. First motion vector is advantageously composed of a value of ($MV1_m$, $MV1_n$) having a horizontal component $MV1_m$ and a vertical component $MV1_n$.

The output of first motion detector 300 is provided to a vector component detector 400, which advantageously detects whether there is a vector component of a half-pixel size in any of the vertical, horizontal and two diagonal directions, centered on the reference pixel, in response to the error values. The output of vector component detector 400 is preferably provided to a second motion detector 500 for vector-summing the vector components detected by vector component detector 400 and generating second motion vector.

More specifically, vector component detector 400 includes a vertical component detector 410 for detecting a vertical component of the second motion vector, a horizontal component detector 420 for detecting a horizontal component of the second motion vector and first and second diagonal component detectors 430 and 440 for detecting two diagonal components of the second motion vector, respectively.

Second motion detector 500 preferentially includes a memory, e.g., a ROM which stores the vector summation results of the producible half-pixel motion vectors. The outputs of the first motion detector 300 and the second motion detector 500 are advantageously provided to a motion vector generator 600 which adds first motion vector ($MV1_m$, $MV1_n$) to the second motion vector generated by second motion detector 500.

Motion vector generator 600 includes a first subtractor 610, which subtracts the horizontal component value of the second motion vector from horizontal component $Mv1_m$ of the first motion vector supplied from first motion detector 300, and a second subtractor 620, which subtracts the vertical component value of the second motion vector from vertical component $Mv1_n$ of the first motion vector supplied from first motion detector 300. Motion vector generator 600 advantageously includes a vector component adder 630 for adding the outputs of subtractors 610 and 620 and second motion detector 500 to each other.

As shown in FIG. 1, if the video signal of the present frame among the video signals of two frames, which are temporally adjacent to each other, is input to $N_1 \times N_2$ block formation unit 100, the input present frame video signal is stored as $N_1 \times N_2$ pixels in $N_1 \times N_2$ block formation unit 100. At the same time that the video signal of the present frame is input to $N_1 \times N_2$ block formation unit 100, the previous frame video signal is input $M_1 \times M_2$ search area formation unit 200. Accordingly, $M_1 \times M_2$ search area formation unit 200 stores the previous frame video signal as an $M_1 \times M_2$ block, which block is larger than the $N_1 \times N_2$ block associated with block formation unit 100. The video signal in the search area having the $M_1 \times M_2$ block size and the video signal of the $N_1 \times N_2$ block, being completely stored are then output from $M_1 \times M_2$ search area formation unit 200 and $N_1 \times N_2$ block formation unit 100 and applied to first motion detector 300. Preferably, first motion detector 300 compares equal size data block, i.e., compares the present frame video block with a number of other video blocks, each of which has the same size as that of the present frame video block and each of which exists in the search area of the previous frame in units of one pixel, to thereby calculate the motion estimation error. Since such motion estimation error values can be calculated using a number of known methods, the description thereof will be omitted.

When the motion estimation error calculation is completed, first motion detector 300 determines a block location having the minimum motion estimation error as a first motion vector in units of integer-pixel and supplies the determined result to motion vector generator 600 for each component of the vector ($MV1_m$, $MV1_n$).

Figure 2:
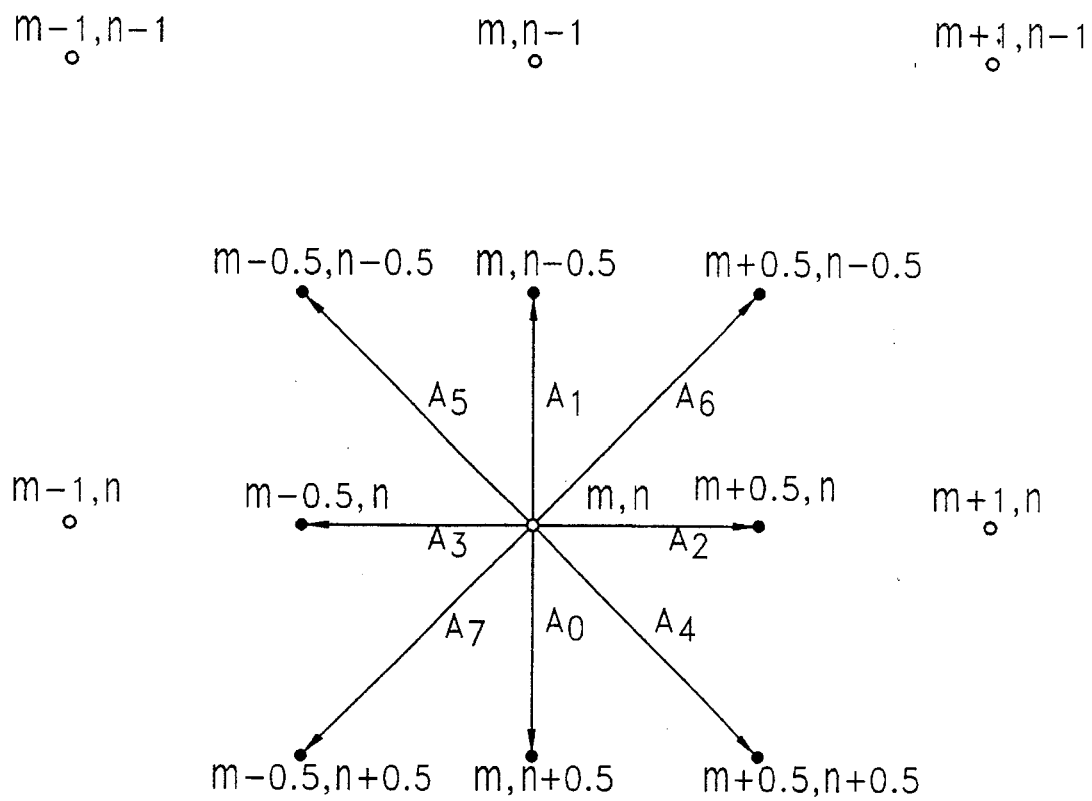
FIG. 2 is a conceptual diagram which is useful in explaining motion vector having units of one pixel and half-pixels.

FIG. 2 is a conceptual view for explaining the pixel unit and half-pixel unit, wherein the symbol ○ represents an interval of one pixel while the symbol • represents a half-pixel interval. Preferably, first motion detector 300 shifts the previous video block corresponding to the first motion vector by one pixel in the vertical, the horizontal and two different diagonal directions to thereby form peripheral video blocks. In an exemplary case, when the motion estimation error corresponding to the first motion vector is D(m, n), the motion estimation errors corresponding to the peripheral video blocks become D(m, n−1), D(m, n+1), D(m−1, n), D(m+1, n), D(m−1, n−1), D(m+1, n+1), D(m+1, n−1), and D(m−1, n+1) as shown in FIG. 2, respectively. These motion estimation errors are output from first motion detector 300 and supplied to the respective component detectors 410, 420, 430 and 440 in vector component detector 400.

Vector component detector 400 detects whether there is the second motion vector component with respect to each direction and supplies the detected result to second motion detector 500. In the exemplary case illustrated in FIG. 1, the vertical component, the horizontal component and two diagonal components of the second motion vector having a half-pixel unit are independently determined. It will be appreciated that, since vertical component detector 410, horizontal component detector 420 and first and second diagonal component detectors 430 and 440 all employ the same component detection method, only an operation of vertical component detector 410, which determines the vertical component of the half-pixel unit motion vector, will be described below.

Figure 3:
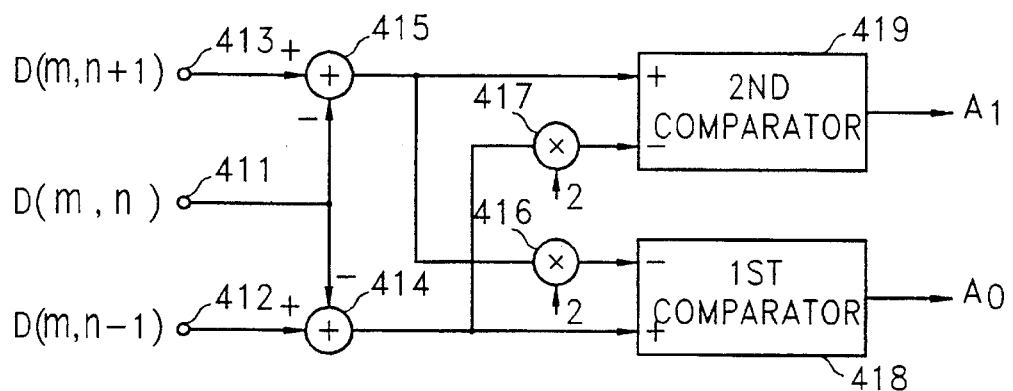
FIG. 3 is a low level block diagram showing an exemplary vertical component detector using in the motion vector estimation apparatus illustrated in FIG. 1.

FIG. 3 is a low level block diagram showing an exemplary vertical component detector 410 according to the motion estimation apparatus shown in FIG. 1. In FIG. 3, vertical component detector 410 includes three input terminals 411, 412 and 413, which terminals advantageously correspond to the motion estimation error outputs of first motion detector 300, a third subtractor 414 for subtracting the input D(m, n) of first input terminal 411 from the input D(m, n−1) of second input terminal 412, and a fourth subtractor 415 for subtracting the input D(m, n) of first input terminal 411 from the input D(m, n+1) of third input terminal 413. The output of third subtractor 414 is connected to a second multiplier 417 for multiplying the output signal of third subtractor 414 by a predetermined coefficient. The output of fourth subtractor 415 is connected to a first multiplier 416 for multiplying the output signal of fourth subtractor 415 by a predetermined coefficient. Preferably, the output of third subtractor 414 is also connected to first comparator 418 for comparing the output signal of third subtractor 414 with the output signal of first multiplier 416 while the output of fourth subtractor 415 is also connected to a second comparator 419 for comparing the output signal of fourth subtractor 415 with the output signal of second multiplier 417.

Vertical component detector 410 in vector component detector 400 receives the motion estimation errors representing the vertical direction which are applied from the corresponding outputs of first motion detector 300. In an exemplary case, vertical component detector 410 receives the motion estimation errors, D(m, n), D(m, n−1) and D(m, n+1) through the corresponding input terminals 411, 412 and 413. Third subtractor 414 subtracts motion estimation error D(m, n) received through first input terminal 411 from motion estimation error D(m, n−1) received through second input terminal 412. Fourth subtractor 415 subtracts motion estimation error D(m, n) received through first input terminal 411 from motion estimation error D(m, n+1) received through third input terminal 413.

First multiplier 416 multiplies the signal supplied from fourth subtractor 415 by a predetermined coefficient, e.g., by a factor of 2. Second multiplier 417 multiplies the signal supplied from first subtractor 414 by a predetermined coefficient, e.g., 2. First comparator 418 compares the signals supplied from third subtractor 414 and first multiplier 416 with each other and outputs a binary signal. Second comparator 419 compares the signals supplied from fourth subtractor 415 and second multiplier 417 with each other and outputs a binary signal. The operation of vertical component detector 410 can be represented as the following conditional equations.

$$[D(m, n-1)-D(m, n)]>2[D(m, n+1)-D(m, n)] \quad (1)$$

$$2[D(m, n-1)-D(m, n)]<[D(m, n+1)-D(m, n)] \quad (2)$$

Preferably, first comparator 418 of vertical component detector 410 supplies a binary signal "1" to the corresponding address input $A_0$ of second motion detector 500 if condition (1) is met, while first comparator 418 supplies binary signal "0" to address input $A_0$ of second motion detector 500 if condition (1) is not satisfied. Second comparator 419 supplies a binary signal "1" to corresponding address input $A_1$ of second motion detector 500 if condition (2) is met, while second comparator 419 supplies binary signal "0" to corresponding address input $A_1$ of second motion detector 500 if condition (2)is not fulfilled. It should be noted that these conditions cannot be satisfied simultaneously. It should also be noted that when conditions (1) and (2) are not satisfied, the vertical component of the second motion vector becomes "0".

Horizontal component detector 420 and first and second diagonal component detectors 430 and 440 in vector component detector 400 each perform the same operation as described with respect to vertical component detector 410 to generate respective half-pixel motion vector. The ROM advantageously performing the function of second motion detector 500 stores the second motion vector of which the vector value is varied according to the vector summation result of the producible components of the respective directions, as a pattern of a look-up table. Second motion detector 500 receives the binary signals supplied from respective vertical, horizontal and first and second diagonal component detectors 410, 420, 430 and 440 in vector component detector 400 through address inputs $A_0$ through $A_7$ and outputs the vector summation result stored at the corresponding address. Advantageously, address inputs $A_0$ through $A_7$ of second motion detector 500 represent the presence of eight separate generated components having respectively different directions, as shown in FIG. 2.

Figure 4A:
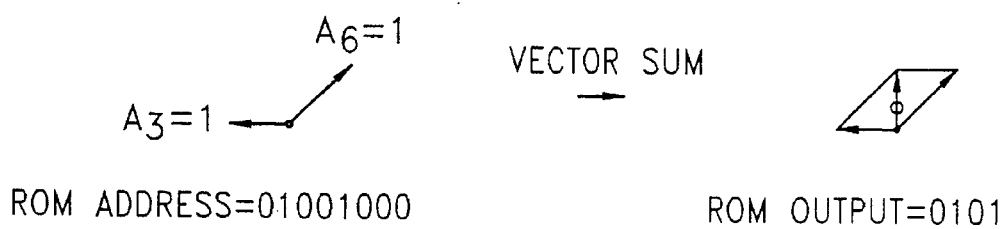
FIGS. 4A, 4B and 4C are representative views of multiple vector components which are useful in explaining vector summation of half-pixel motion vector signals.
Figure 4B:
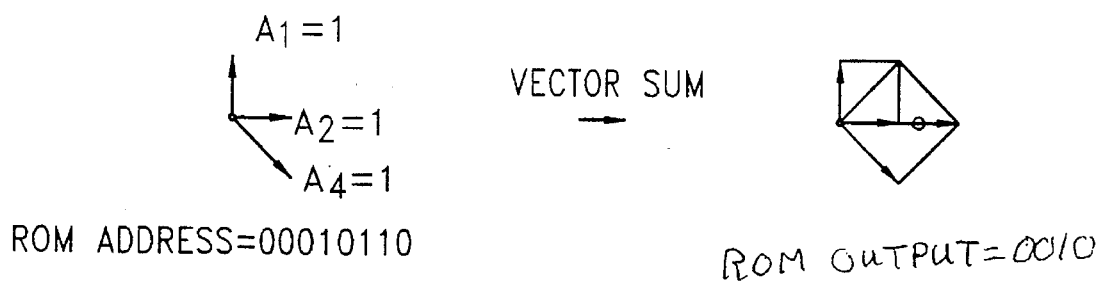
Figure 4C:
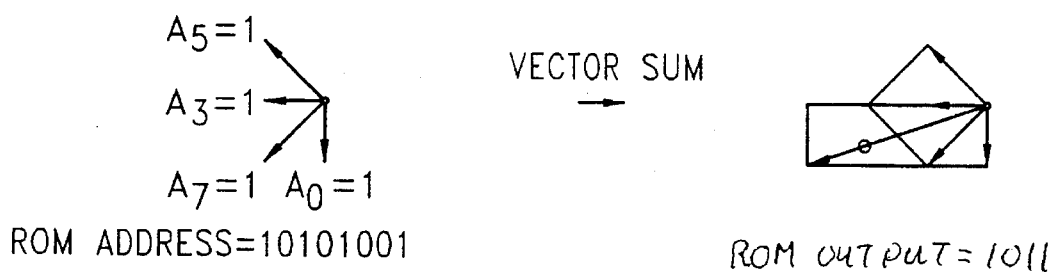

FIGS. 4A, 4B and 4C show representative vector summations of respective components of the second motion vector having half-pixel accuracy. As shown in FIGS. 4A–4C, if the vector components of the respectively different directions are generated, second motion detector 500 vector-sums these generated components. If the summed vector matches the vertical axis, the second motion vector has only the vertical direction component. If the summed vector matches the horizontal axis, the second motion vector has only the horizontal direction component. It will be appreciated that if the summed vector does not match both the vertical and horizontal axes, the second vector has only a diagonal component.

For example, as shown in FIG. 4A, if signal "01001000" is input from vector component detector 400 to address inputs $A_7, A_8, \ldots, A_0$ of second motion detector 500, second motion detector 500 supplies signal "0101" corresponding to the input address value to data outputs $O_3, O_2, O_1$ and $O_0$. Thus, the second motion vector supplied from second motion detector 500 is obtained by summing the vector components of the "$A_3$" and "$A_6$" directions as shown in FIG. 2, which vector-sum has a component value of "+0.5" in the $A_1$ direction, that is, the vertical direction.

On the other hand, as shown in FIG. 4B, if address value "00010110" is input to address inputs $A_7, A_6 \ldots, A_0$ of second motion detector 500, second motion detector 500 supplies signal "0010" corresponding to the input address value to data outputs $O_3, O_2, O_1$ and $O_0$. It will be appreciated that the second motion vector is obtained by summing the vector components of the "$A_1$", "$A_2$" and "$A_4$" directions, which vector-sum has a component value of "+1" in the $A_2$ direction, i.e., the horizontal direction.

Preferably, as shown in FIG. 4C, when the address value of address inputs $A_7, A_8, \ldots, A_0$ of second motion detector 500 is "10101001," second motion detector 500 outputs data "1011" corresponding to the vector components of "$A_0$," "$A_3$" and "$A_7$" through data outputs $O_3, O_2, O_1$ and $O_0$. Consequently, the second motion vector supplied from second motion detector 500 advantageously can be obtained by summing the vector components of the "$A_3$" and "$A_6$" directions, as shown in FIG. 2, which vector-sum has a component value of "+0.5" in the $A_1$ direction, i.e., in the vertical direction.

From FIG. 4C it will be noted that if the address value of address inputs $A_7, A_6, \ldots, A_0$ of second motion detector 500 is "10101001", second motion detector 500 outputs data "1011" corresponding to the vector components of "$A_0$", "$A_3$", "$A_5$" and "$A_7$" through data inputs $O_3, O_2, O_1$ and $O_0$. This data is the second motion vector of the second diagonal direction having a size of "+1.5" in the $A_3$ direction and a size of "+0.5" in the "$A_0$" direction. According to the preferred embodiment, the direction proceeding from left to right in FIG. 2 represents a positive direction with respect to the horizontal components, and the direction proceeding from top to bottom represents a positive direction with respect to the vertical components. Preferably, the vertical and horizontal components of the second motion vector are represented as one bit. When the size of the component is "+0.5", the component is represented as a bit of "1" while when the size of the component is "0", the component is represented as a bit of "0".

First subtractor 610 of motion vector generator 600 subtracts the output data at output $O_3$ of second motion detector 500 from the horizontal component of the first motion vector output from first motion detector 300. Second subtractor 620 advantageously subtracts the output data at output $O_2$ of second motion detector 500 from the vertical component of the first motion vector. Preferably, vector component adder 630 adds the data output from first and second subtractors 610 and 620 to the data supplied through outputs $O_1$ and $O_0$ of second motion detector 500, with respect to the respective components. That is, the data output from first subtractor 610 is added to the data at output $O_1$ while the data output from second subtractor 620 is added to the data at output $O_0$.

In an exemplary case, when signal "0101" is output through outputs $O_3, O_2, O_1$ and $O_0$ of second motion detector 500, first subtractor 610 outputs the horizontal component signal $MV1_m$ supplied from first motion detector 300 as it is, while second subtractor 620 subtracts a bit value of "1" at output $O_2$ of second motion detector 500 from vertical component signal $MV1_n$. As a result, vector component adder 630 outputs a vector summation of the first motion vector and the second motion vector, i.e., final motion vector MV, which may advantageously be obtained by adding the vertical component of the one pixel unit of the first motion vector output from first motion detector 300 to the vertical components of the half-pixel unit of the second motion vector. The horizontal component constituting motion vector MV becomes the horizontal component of the first motion vector.

As described above, the present invention relates a half-pixel motion vector estimation method and apparatus thereof using vector summation. In particular, the half-pixel motion vector, which is generated in the horizontal, the vertical and two diagonal directions is output via the ROM acting as second motion detector means and the output data of the ROM is then vector-summed through a plurality of subtractors and a respective vector component adder. Consequently, the motion vector having half-pixel accuracy can be simply measured, to thereby enable a finer, i.e., more accurate motion estimation.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A motion vector estimation apparatus for estimating movement in a video signal using a search area composed of a present video block and a plurality of video blocks, each of which is identical in size to that of the present video block, said motion vector estimation apparatus comprising:

first motion detector means in which data in the present video block and data in the search area is received, for detecting a first motion vector signal due to data differences between respective video blocks, for detecting and comparing data for a respective previous video block corresponding to the detected first motion vector signal and data of a plurality of peripheral video blocks obtained by shifting the previous video block corresponding to said first motion vector by one pixel in the vertical, the horizontal, and the two diagonal directions, respectively, with the data of the present video block, thereby generating respective error signals due to the video data differences between respective present video and peripheral video blocks;

vector component detection means for generating component signals representing whether there is a vertical component and a horizontal component of a second motion vector having half-pixel accuracy with respect to the vertical, the horizontal and the two diagonal directions in response to the error signals supplied from the first motion detector means;

second motion detector means for detecting the second motion vector in response to respective component detection signals supplied from the vector component detection means; and motion vector generating means for vector-summing the first and the second motion vector signals and generating a vector-summed signal.

2. The motion vector estimation apparatus having half-pixel accuracy according to claim 1, wherein said vestor component detection means comprises:

a vertical component detector which receives the error signals between each of the previous video block and the peripheral video blocks which are located at the top and bottom of the previous video block and the present video block and generates a first component detection signal which represents whether there is the vertical component of the second motion vector;

a horizontal component detector which receives the error signals between each of the previous video block and the peripheral video blocks which are located at the left and right of the previous video block and the present video block and generates a second component detection signal which represents whether there is the horizontal component of the second motion vector;

a first diagonal component detector which receives the error signals between each of the previous video block and the peripheral video blocks which are located at a first diagonal position of the previous video block and the present video block and generates a third component detection signal which represents whether there is the first diagonal component of the second motion vector;

a second diagonal component detector which receives the error signals between each of the previous video block and the peripheral video blocks which are located at a second diagonal position of the previous video block and the present video block and generates a fourth component detection signal which represents whether there is the second diagonal component of the second motion vector.

3. The motion vector estimation apparatus having half-pixel accuracy according to claim 2, wherein each of said component detectors comprises:

a first subtractor for subtracting the error signal corresponding to the previous video block from the error signal corresponding to the first peripheral video block located in a selected one of a left and an upper end compared to the previous video block with respect to the direction used for component detection;

a second subtractor for subtracting the error signal corresponding to the previous video block from the error signal corresponding to the second peripheral video block located in a selected one of a right and a lower end compared to the previous video block with respect to the direction used or the component detection;

a first multiplier for multiplying data output from the first subtractor by a predetermined first coefficient;

a second multiplier for multiplying data output from the second subtractor by a predetermined second coefficient;

a first comparator for checking if the data output from the first subtractor is smaller than the data output from the first multiplier and generating a respective one of the first through fourth component detection signals corresponding to the respective component detected direction; and a second comparator for checking if the data output from the second subtractor is smaller than the data output from the second multiplier and generating a respective one of said first through fourth component detection signals corresponding to the respective component detected direction.

4. The motion vector estimation apparatus having half-pixel accuracy according to claim 3, wherein said second motion detector means is a memory in which all the second motion vector signals detectable by said component detectors are stored, and wherein the second motion vector corresponding to the address of a combination of the respective component detection signals supplied from said each of said component detectors is separated into a first horizontal component signal and a first vertical component signal each of which has a pixel unit, and second horizontal component signal and second vertical component signal each of which has a half-pixel unit, is output as separated signals.

5. The motion vector estimation apparatus having half-pixel accuracy according to claim 4, wherein said motion vector generating means comprises:

a third subtractor for subtracting the first horizontal component signal from a horizontal component signal of the first motion vector signal;

a fourth subtractor for subtracting the first vertical component signal from a vertical component signal of the first motion vector signal; and a vector component adder for receiving the output signals of the third and fourth subtractors and the second horizontal and the second vertical component signals from the memory, and adding respective received signals according to associated component signals.

6. A motion vector estimation method for estimating movement of a video signal using a search area composed of a present video block and video blocks each of which is identical in size to the present video block, said motion vector estimation method comprising the steps of:

(a) receiving data in the present video block and data in the search area and then detecting a first motion vector due to a data difference between respective video blocks;

(b) determining the previous video block corresponding to the detected first motion vector, shifting the previous video block by one pixel in vertical, horizontal and diagonal directions, respectively, thereby forming peripheral video blocks;

(c) comparing the respective data of the previous video block and the peripheral video blocks with the data of the present video block and generating error signals due to the video data difference between respective blocks in correspondence to the respective block comparison;

(d) checking whether there is a vertical component and a horizontal component of a second motion vector having half-pixel accuracy with respect to the vertical, the horizontal and the diagonal directions in response to the error signals;

(e) generating the second motion vector according to the result of said checking step; and (f) vector-summing the first and second motion vectors to thereby generate a final motion vector.

7. The motion estimation method having half-pixel accuracy according to claim 6, wherein said step (d) comprises the steps of:

(g) detecting a first component detection signal which represents whether there is the vertical component of the second motion vector in response to the error signals between each of the previous video block and the peripheral video blocks which are located at the top and bottom of the previous video block, and the present video block;

(h) detecting a second component detection signal which represents whether there is the horizontal component of the second motion vector in response to the error signals between each of the previous video blocks and the peripheral video blocks winch are located at the left and right of the previous video block, and the present video block;

(i) detecting a third component detection signal which represents whether there is the horizontal component of the second motion vector in response to the error signals between each of the previous video blocks and the previous video blocks and the peripheral video blocks which are located at a first diagonal position of the previous video block, and the present video block;

(j) detecting a fourth component detection signal which represents whether there is the second diagonal component of the second motion vector in response to the error signals between each of the previous video blocks and the peripheral video blocks which are located at a second diagonal position of the previous video block, and the present video block.

8. The motion vector estimation method having half-pixel accuracy according to claim 7, wherein each of said detecting steps (g) through (j) comprises the steps of:

(k) subtracting the error signal corresponding to the previous video block from the error signal corresponding to the first peripheral video block located in the left and/or the upper end compared to the previous video block with respect to the direction used for respective component detection;

(l) subtracting the error signal corresponding to the previous video block from the error signal corresponding to the second peripheral video block located in the right and/or the lower end compared to the previous video block with respect to the direction used for respective component detection;

(m) multiplying data output from the first subtracting step by a predetermined coefficient;

(n) multiplying data output from the second subtracting step by a predetermined coefficient;

(o) checking if the data output from the first subtracting step is smaller than the output data of the first multiplying step to generate a respective one of said first through fourth component detection signals corresponding to the component detected direction; and (p) checking if the data output from the second subtracting step is smaller than the output data of the second multiplying step to generate a respective one of said first through fourth component detection signals corresponding to associated component detected direction.

9. The motion vector estimation method having half-pixel accuracy according to claim 8, wherein said second motion vector generating step (e) comprises the steps of:

(q) storing all of possible second motion vector signals detectable by said respective component detecting steps (g) through (j); and (r) separating the second motion vector corresponding to the address by combination of respective component detection signals detected by the component detecting steps (g) through (j) into a first horizontal component signal and a first vertical component signal each of which represents a pixel unit, and second horizontal component signal and second horizontal component signal each of which represents a half-pixel unit, to thereby generate the component signals.

10. The motion vector estimation apparatus having half-pixel accuracy according to claim 9, wherein said vector-summing step (f) comprises the steps of:

(s) subtracting the first horizontal component signal from the horizontal component signal of the first motion vector signal;

(t) subtracting the first vertical component signal from the vertical component signal of the first motion vector signal; and (u) adding the output signals of said subtracting steps (s) and (t) and the second horizontal and the second vertical component signals from the component signal separating step (r), respectively.

11. A motion vector estimation method for estimating movement of a video signal using a present video block representing a predetermined search area with respect to a plurality of previous video blocks extracted from a previous adjacent video frame, each of said previous video blocks being identical in size with the present video block, said motion vector estimation method comprising the steps of:

(a) detecting a first motion vector due to differences in data between said present video block and said previous video blocks in response to receipt of data corresponding to said present video block and said previous video blocks in said search area;

(b) generating a plurality of peripheral video blocks by shifting an associated one of said previous video blocks upon which said first motion vector is based by one pixel in each of the vertical, the horizontal and two diagonal directions, respectively;

(c) comparing each of said peripheral video blocks with said present video block to identify respective vertical and horizontal components to thereby generate a second motion vector having half-pixel accuracy;

(d) vector-summing the first and the second motion vectors.

12. The motion estimation method having half-pixel accuracy according to claim 11, wherein said step (d) comprises the steps of:

(e) subtracting a first portion of said second motion vector from a respective first portion of said first motion vector to thereby generate a first motion vector difference;

(f) subtracting a second portion of said second motion vector from a respective second portion of said first motion vector to thereby generate a second motion vector difference;

(g) summing said first motion difference, said second motion vector difference and a residual portion of said second motion vector to thereby produce a final motion vector of said half-pixel accuracy.

13. The motion vector estimation method having half-pixel accuracy according to claim 11, wherein said step (c) comprises the steps of:

(h) comparing respective data of said peripheral video blocks with data corresponding to said present video block to thereby generate associated error signals due to video data differences;

(i) identifying respective vertical and horizontal components representative of said second motion vector having half-pixel accuracy with respect to said vertical, said horizontal and said two diagonal directions in response to said error signals;

(j) generating said second motion vector responsive to said vertical and said horizontal components.

* * * * *